United States Patent [19]

Vassallo

[11] 4,343,480
[45] Aug. 10, 1982

[54] PIPE BELL AND GASKET

[76] Inventor: Efrain D. Vassallo, La Rambla G-558, Ponce, P.R. 00731

[21] Appl. No.: 162,377

[22] Filed: Jun. 23, 1980

[51] Int. Cl.$^3$ ............................................. F16J 15/32
[52] U.S. Cl. ................................ 277/207 A; 277/208; 285/110; 285/231; 285/345; 285/379
[58] Field of Search ............... 285/110, 230, 231, 232, 285/345, 379; 277/207 R, 207 A, 207 B, 208

[56] References Cited

U.S. PATENT DOCUMENTS

| | | | |
|---|---|---|---|
| 2,049,801 | 8/1936 | Gage | 285/193 |
| 2,572,419 | 10/1951 | Wyss | 285/170 |
| 2,620,206 | 12/1952 | Cornelius | 285/163 |
| 2,871,031 | 1/1959 | Altemus et al. | 285/13 |
| 2,980,449 | 4/1961 | Dunton | 277/207 A X |
| 3,179,446 | 4/1965 | Paterson | 285/110 |
| 3,203,511 | 8/1965 | Long | 277/208 X |
| 3,219,354 | 11/1965 | Kazienko | 277/207 A X |
| 3,315,971 | 4/1967 | Sakurada | 285/110 X |
| 3,390,890 | 7/1968 | Kurtz | 277/205 |
| 3,503,619 | 3/1970 | Hainneville | 285/345 X |
| 3,544,119 | 12/1970 | Glover | 285/379 X |
| 4,034,994 | 7/1977 | Ohta et al. | 277/207 A |
| 4,143,884 | 3/1979 | Nicholas et al. | 277/207 A |

FOREIGN PATENT DOCUMENTS

| | | | |
|---|---|---|---|
| 1118551 | 11/1961 | Fed. Rep. of Germany | 285/110 |
| 2205532 | 8/1973 | Fed. Rep. of Germany | 285/110 |
| 74793 | 1/1961 | France | 285/110 |
| 7800760 | 2/1979 | Sweden | 285/110 |
| 1033756 | 6/1966 | United Kingdom | 285/230 |
| 1168040 | 10/1969 | United Kingdom | 285/231 |

OTHER PUBLICATIONS

Drawing Number LP-002, dated 29 Mar. 1979, Vassallo Industries, Ponce, Puerto Rico, 00731, 1 p., entitled "New Pressure Seal".

Primary Examiner—Robert S. Ward, Jr.
Attorney, Agent, or Firm—Weiser, Stapler & Spivak

[57] ABSTRACT

A pipe bell including a radially extending groove which is defined rearwardly by an acute angle of design to firmly seat a gasket therein. The groove is forwardly defined by an inwardly curved mouth or inward bend of suitable size to receive the spigot end of the next adjacent pipe length therein. A gasket which includes a forward, circular lip and an integral, rearward, larger lip is positioned within the groove to seal against the spigot end of the next adjacent pipe length. The gasket includes an angular rear shoulder of suitable configuration to lock within the pipe groove between the rearward acute angle and the forward bent end and may be peripherally outwardly arcuately shaped for better sealing. If desired, the gasket may be provided with an inwardly open groove to receive therein a plastic retaining and locking ring to aid in preventing seal movement.

17 Claims, 7 Drawing Figures

PIPE BELL AND GASKET

BACKGROUND OF THE INVENTION

The present invention relates generally to the field of pipe connections, and more particularly, is directed to an improved bell and spigot joint including a bent bell end for retaining a gasket within a circular groove.

It is presently the usual practice to extrude plastic pipes in elongate, cylindrical configuration of a desired diameter and then to cut the extruded product into individual lengths of convenient size suitable for handling, shipping and installing, for example, ten foot lengths or twenty foot lengths. Each length of pipe is enlarged or "belled" at one end sufficiently to join the next adjacent pipe section by receiving therewithin the unenlarged or "spigot" end of the adjacent length of pipe. The inside diameter of the bell is formed sufficiently large to receive the spigot end of the next section of pipe with sufficient clearance to allow the application of packing, caulking, gaskets or other devices designed to prevent leakage at the pipe joints when a plurality of pipe lengths are joined to form a pipe line. Depending upon the intended pressure of the fluid being conveyed, and other design parameters, the seal between adjacent lengths of pipe will be required to be more or less sophisticated.

Prior workers in the art, particularly in the plastic pipe industry, have developed various gaskets of suitable design to be retained within an internal groove formed in the bell. The gaskets were configured and designed to permit the pipe joint to be easily and rapidly made and to prevent leakage upon completion of the system. While experience has proved that the use of a formed gasket seated within an annular recess or groove which had been formed in the bell of a pipe is an efficient and suitable construction for sealing the joints between adjacent lengths of plastic pipe, prior workers have encountered difficulties in maintaining the seal under pressure or vacuum conditions. As operating pressures increase, the difficulties encountered in providing efficient and reliable seals have also increased.

In an effort to solve the sealing problems in pressure or vacuum piping systems, prior workers have developed gaskets of the type including extending lips to press against the spigot end. Additionally, other workers have provided gaskets having an internal peripheral groove within which is seated a locking ring to prevent movement of the seal and to discourage gasket blowout when the system pressure was applied. In a further effort to prevent unseating of the gasket when the pipe joint was made up or to prevent gasket blowout under severe conditions of use, efforts have been made to lock the gasket within the annular groove in the bell. Such efforts by prior workers in the art have included machining the groove to an angular configuration to firmly seat the gasket in the groove. Other workers have attempted to lock the gasket in the groove by applying, either by a threaded connection or by an adhesive juncture, an outer locking ring or retainer of smaller diameter than the gasket itself. Such prior art attempts to retain the gasket within the groove have proved to be only modestly successful and the end results have not justified the increase in manufacturing costs. Despite such efforts by the prior workers in the art, the need still remains to provide an efficient, trouble free and inexpensive sealing system that is highly reliable when in use with pressurized or vacuum applications.

SUMMARY OF THE INVENTION

The invention relates generally to a novel configuration of a pipe bell and gasket retaining construction, and more particularly, is directed to an improved pipe bell design including an annular groove which is endwardly defined by a circular, radially inward, integral bend.

In accordance with the present invention, a plastic pipe or plastic fitting is provided at one end with a hub or bell construction and the hub is formed to define a radially inwardly open gasket retaining groove. The groove is rearwardly formed with an angular corner and preferably the defined angle is less than ninety degrees from the axis of the pipe to thereby provide a firm shoulder to securely seat the cooperating corner of a gasket in a manner to discourage movement of the gasket within the groove even under the most severe conditions of assembly and use. The forward or outer extent of the groove is defined by a circular, inward bend of the pipe end material to provide a bent forward gasket retainer. The gasket retaining front inward bend not only serves to firmly retain the gasket, but also provides manufacturing economies by eliminating previous costs involved in molding and applying separate end gasket retainers.

A cooperating gasket is engageable within the internal groove of the fitting bell or hub and as above set forth, the gasket is formed with a rearward acute angle of design to securely seat within the angular construction which defines the rearward terminus of the groove. The gasket is preferably fabricated of a suitable resilient, rubber composition and includes a forward, angular, first lip to concentrically align the spigot end of the next adjacent length of pipe as the spigot end is inserted into the hub. Additionally, the first lip serves to peripherally wipe the inserted portion of the spigot of the pipe to prevent dirt or other foreign materials from entering the piping system as the parts are being joined.

The gasket further includes an integral, rearwardly spaced, angular second lip which is larger than the first lip and is designed to bear peripherally inwardly against the spigot end of the pipe to form an effective pressure seal between the bell end of the pipe or fitting and the spigot end of the adjacent length of pipe. As pressure within the system increases, the pressure urges against the second lip to provide an even more effective and tighter seal. In a preferred embodiment, the radially outward surface of the gasket is formed to the configuration of an arch or radius and bears against the outer peripheral base of the groove. The gasket outward surface acts as a cushion and transmits pressure from within the piping system to the first and second lips to provide a tighter seal against the spigot end.

If desired, the gasket may itself be provided with an internal groove defined between the first and second lips in a manner to receive therein a locking ring which may be formed of a hard plastic material, such as polypropylene plastic. In use, such a locking ring acts to prevent gasket unseating as the joint is made up and additionally aids in preventing gasket blowout, especially in high pressure installations. When a locking ring is utilized, it is often possible to employ softer rubber materials in the gasket to thereby insure better sealing against the pipe spigot due to the increased resiliency of the gasket material.

As employed herein, the terms "pipe" and "fitting" are defined generically as equivalent components of a piping system for purposes of this application. Accordingly, terms such as "hub", "bell", "spigot", etc. as herein used are intended to be equally applicable and interchangeable with both pipes and fittings.

It is therefore an object of the present invention to provide an improved pipe bell and gasket therefor of the type set forth.

It is another object of the present invention to provide a novel pipe bell including a peripheral gasket retaining groove wherein the forward end of the groove is defined by an inward bend of the leading edge of the bell material.

If is another object of the present invention to provide a novel pipe bell of the type including a gasket receiving groove, the groove being rearwardly defined by a sharp, angular construction and the groove being forwardly defined by an integral inward bend of the forward end of the bell material.

It is another object of the present invention to provide a novel pipe bell and gasket therefor including an annular groove formed in the bell to receive the gasket, the groove being rearwardly defined by a sharp shoulder and forwardly defined by an inward bend at the forward end of the bell and wherein the gasket includes an angular shoulder to firmly seat within the sharp shoulder of the groove to discourage movement of the gasket relative to the pipe bell under all conditions of use.

It is another object of the present invention to provide a novel gasket for use within an annular groove in a bell formed in a plastic pipe or fitting wherein the gasket includes a leading first lip of suitable dimensions to both center the spigot end of the adjacent pipe and to wipe the spigot end clean as it passes the gasket and further includes a rearwardly spaced, second lip suitable to bear against and seal against the outer periphery of the spigot end of the adjacent pipe.

Other objects and a fuller understanding of the invention will be had by referring to the following description and claims taken in conjunction with the accompanying drawings wherein like reference characters refer to similar parts throughout the several views and in which:

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Figure 1:
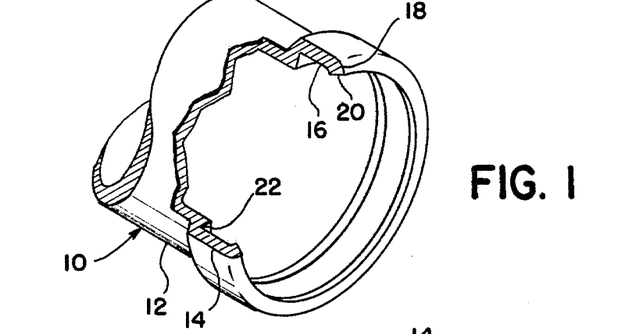
FIG. 1 is a perspective view of a pipe bell configured in accordance with the teachings of the present invention.

Referring now to the drawings, there is illustrated in FIG. 1 the bell end of a plastic pipe or fitting 10 which is formed in known manner to provide an enlarged hub 12 of suitable size to receive the spigot end 24 of the next adjacent length of pipe for sealing engagement therewith. The hub terminates endwardly in an enlarged end 14 which is molded or otherwise formed by utilizing known tools and techniques to provide an internally open, peripheral groove 16 of suitable size and shape to receive therein a sealing gasket as hereinafter more fully set forth.

Figure 2:
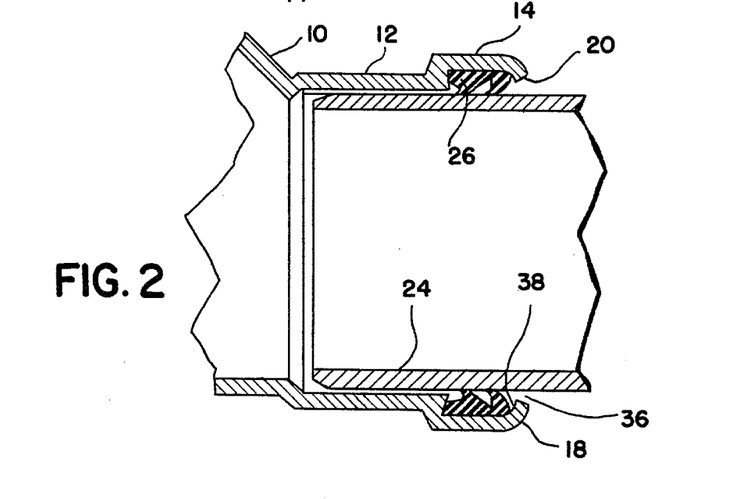
FIG. 2 is a cross sectional view of the bell of FIG. 1 and showing a gasket and the spigot end of a pipe in sealing engagement.

Referring now to FIGS. 1 and 2, it will be noted that the internal groove 16 is formed of sufficient depth to receive therein the annular gasket 26. The groove is rearwardly defined by a sharp corner or angle 22. The corner 22 is formed at an angle of more than ninety-one degrees from a line parallel to the axis of the pipe 10 and preferably is an acute angle. The corner 22 is open in the direction of spigot end insertion to thereby resist the forces tending to unseat the gasket 26. The groove 16 is forwardly or endwardly defined by a bent end or retainer 18 which may be conveniently formed by radially inwardly bending the end of the hub as illustrated. The gasket retainer 18 terminates in an annular angular edge 20, which angle projects at approximately forty-five degrees from the surface of the spigot end 24 to provide a peripheral, inclined, entrance channel to facilitate guiding the spigot end 24 into the hub 12 when making the joint. As best seen in FIG. 2, the retainer 18 terminates in circular, spaced relationship radially outwardly from the pipe spigot end 24 to define an annular clearance space 36 between the bell or hub 12 of the fitting 10 and the spigot end 24 of the next adjacent length of pipe when the junction between the two plastic parts is formed.

Figure 3:
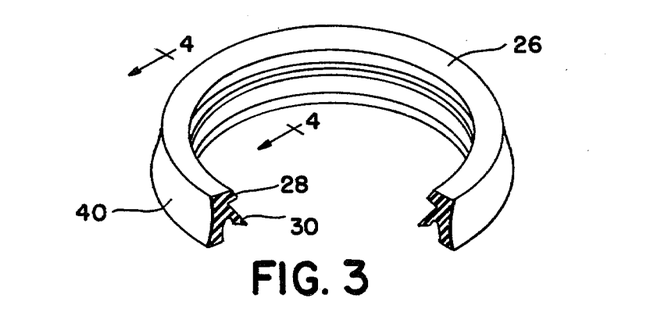
FIG. 3 is an enlarged, perspective view of the gasket of FIG. 2, partially broken away to expose construction details.
Figures 4, 6, 7:
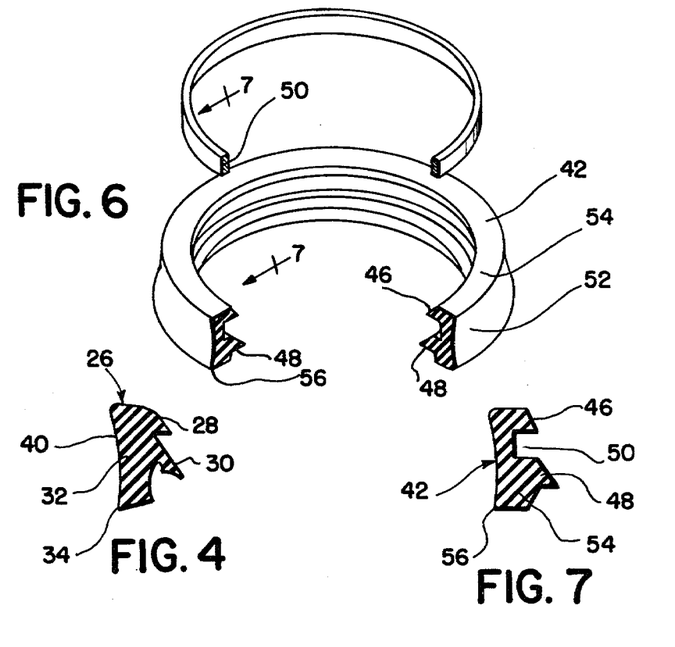
FIG. 4 is a cross sectional view taken along line 4—4 on FIG. 3 looking in the direction of the arrows.
FIG. 6 is an enlarged, exploded, perspective view of the modified gasket of FIG. 5, partially broken away to expose interior construction details.
FIG. 7 is a cross sectional view taken along line 7—7 on FIG. 6, looking in the direction of the arrows.

Referring now to FIGS. 3 and 4, the gasket 26 is preferably formed of a resilient, moisture proof material such as natural rubber to provide efficient sealing against the outer periphery of the pipe spigot end 24 when adjacent pipe lengths or fittings are joined. The gasket 26 is formed to an annular shape and comprises generally a peripheral body 32 of heavy or massive configuration to make the seal between the parts more effective under design conditions and to discourage movement of the gasket 26 within the internal groove 16 both when the joint is being made up and also when under actual operating conditions.

The gasket 26 includes a circular leading lip 28 of generally triangular cross sectional configuration which integrally inwardly projects from the gasket body 32. The leading lip 28 serves both to guide and to space the pipe spigot end 24 within the hub 12 and insures proper pipe alignment when the joint is made up. Additionally, the leading lip 28 initially contacts the entire outer periphery of the spigot end 24 of the adjacent pipe as the spigot end is inserted into the hub 12 during the joint making process until the spigot end reaches the position illustrated in FIG. 2. The rubbing or scraping of the leading lip 28 over the spigot end periphery additionally serves to prevent dirt or other unwanted materials from passing through the gasket seal and into the interior of the pipe system.

A second or sealing lip 30 integrally extends from the gasket body 32 and is rearwardly spaced from the leading lip 28. The sealing lip 30 is also preferably triangular in cross sectional configuration and both the leading lip 28 and sealing lip 30 are configured to project rearwardly to facilitate entrance of the spigot end 24 into the hub 12. Both the leading lip 29 and the sealing lip 30 terminate inwardly in respective thin edges 58, 60 which are designed to bend rearwardly upon rearward movement of the spigot end 24 relative to the hub 12 and to discourage forward movement of the spigot end 24 relative to the hub 12. Accordingly, once the joint is made up as illustrated in FIG. 2, the respective edges 58, 60 of the gasket lips 28, 30 act to overcome any forwardly directed forces which might tend to pull the parts 24, 12 apart. Still referring to FIGS. 3 and 4, it will be noted that the gasket body 32 terminates radially outwardly in an arched back 40, which back seats directly against the base 62 of the internal groove 16. The arched back 40 acts to take up tolerances and as a self energizer pocket to transmit additional pressure from the arch to the sealing lips. In this manner, a tighter circular seal between the lip 30 and the lip 28 and the outer periphery of the spigot end 24 can be achieved.

The gasket body 32 terminates rearwardly in a sharp corner or angle 34 which is designed to the same acute angle as the angular corner 22 provided in the internal groove 16. Accordingly, the gasket corner 34 tightly and securely seats within the angular corner 22 of the groove 16 when the gasket is positioned within the groove. The angular configuration of both the groove corner 22 and gasket corner 34 cooperate to discourage movement of the gasket 26 within the groove 16 when the spigot end 24 is inserted as the joint is being made up and additionally, serves to prevent gasket blowout under all conditions of use, even in high pressure applications. As best seen in FIG. 2, the combination of the seat of the gasket corner 34 within the groove corner 22 together with the retainer area 38 of the forward hub bend 18 cooperate to retain the gasket 26 in its designed position within the hub internal groove 16 at all times.

Figure 5:
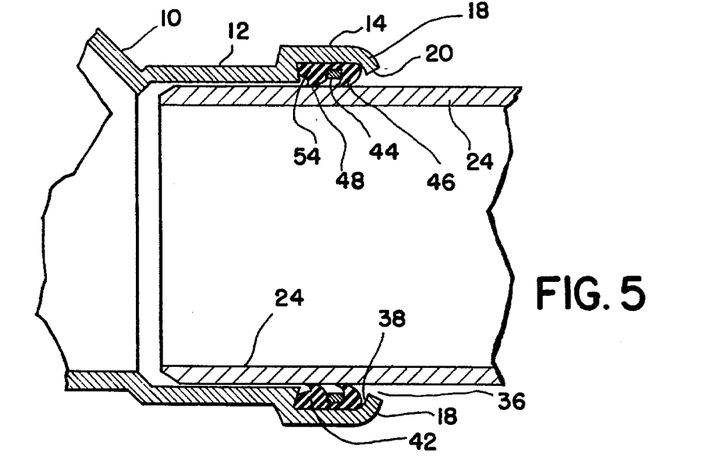
FIG. 5 is a cross sectional view similar to FIG. 2 showing a modified gasket construction.

Referring now to FIGS. 5, 6 and 7, a modified gasket 42 is illustrated seated within the internal groove 16 of the hub 12. In this embodiment, the gasket 42 is provided with an upwardly open, centrally positioned circular groove 50 within which is seated a hard plastic retaining and locking ring 44. The retaining ring 44 may be fabricated of suitable hard plastic materials, such as polypropylene plastic or polyvinylchloride plastic and is formed to a generally annular configuration of suitable diameter. The plastic ring 44 serves the purposes of retaining the gasket forward and rearward lips 46, 48 and the outer periphery of the spigot end 24 in tight sealing engagement. Additionally, the plastic ring 44 can also prevent gasket movement relative to the groove 16 both when the pipe joint is being made up and also when the piping system is in use. At least some of the strength of the plastic ring 44 is transmitted to the body of the modified gasket 42 to strengthen the gasket without interfering with the sealing function or the sealing efficiency of the gasket lips 46, 48.

As illustrated in FIGS. 6 and 7, the circular groove 50 is positioned intermediate the gasket leading lip 46 and the gasket trailing or sealing lip 48. Preferably, the gasket lips 46, 48 are formed similar in configuration and function in the same manner as the gasket lips 28, 30 previously described when considering the gasket 26. Similarly, the modified gasket body 54 includes a sharp, angular corner 56 which is formed to an acute angle to securely position within the acute angle 22 formed rearwardly in the hub groove 16. Additionally, the modified gasket body 54 is preferably formed with the arched back 52 to cooperate with the base 62 of the circular groove 16 to thereby impart additional sealing forces which can be applied by the gasket lips 46, 48 against the outer periphery of the pipe spigot end 24.

In order to use the pipe bell and gasket of the present invention, the gasket 26 or the modified gasket 42 is first positioned within the internal groove 16 of the fitting hub 12. Care should be exercised to securely and firmly seat the gasket sharp corner 34 or 56 in overall peripheral seating engagement within the sharp corner 22 formed in the hub groove 16. The outer end of the gasket 26 or 42 is retained within the groove 16 by the retainer area 38 of the bent fitting end or retainer 18. With the gasket 26 or 42 properly seated within the internal groove 16, the spigot end 26 of the next adjacent length of pipe is then introduced into the hub 12 by concentrically aligning the spigot end 24 to define an annular clearance space 36 between the outer periphery of the spigot end 24 and the inwardly bent hub end 18. Continued inward movement of the spigot end into the hub 12 engages the outer periphery of the spigot end with the leading gasket lip 28 or 46, which lip peripherally wipes the spigot end as the spigot end is advanced into the interior of the hub 12.

Continued insertion of the spigot end 24 into the hub 12 causes the rearward or sealing lip 30 to 48 to peripherally contact and seal against the outer periphery of the spigot end. As previously noted, the arched back 42, 52 of the gasket 26 or 42 is employed to increase the sealing pressures applied by the various lips 28, 30 and 46, 48 against the spigot end 24.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A pipe bell in the cylindrical body of a pipe or fitting, the pipe or fitting having a longitudinal axis comprising
    an enlarged, generally cylindrical, one piece hub formed in the forward end of the said body, the hub having a cylindrical section of a first diameter suitable to overfit an end of an adjacent length of pipe,
    the hub including an integral, radially inward open, internal groove of a second diameter, the second diameter being greater than the first diameter,
    the internal groove being defined forwardly by an integral, radially inward bent retainer,
    the internal groove being defined rearwardly by an integral, circular, angular corner,
    the bent retainer and the hub being of unitary construction.

2. The pipe bell of claim 1 wherein the angle defined by the corner is less than ninety-one degrees from a line parallel with the said longitudinal axis.

3. The pipe bell of claim 1 wherein the groove is defined radially outwardly by an integral, cylindrical base of uniform diameter, the base extending in length from the angular corner to the bent retainer.

4. The pipe bell of claim 1 wherein the bent retainer terminates forwardly in an angular, circular edge, the circular edge forming an angle of approximately forty-five degrees with a line drawn parallel to the said longitudinal axis, the bent retainer defining an annular clearance space between the bent retainer and the said end of an adjacent length of pipe.

5. The pipe bell of claim 1 and a gasket removably insertable into the groove, the gasket comprising an annular body, a leading lip integrally extending radially inwardly from the body and a sealing lip rearwardly spaced from the leading lip and integrally extending radially inwardly from the body, the sealing lip extending radially inwardly a greater distance than the leading lip, the gasket being fabricated of a relatively soft, resilient material, the gasket body terminating rearwardly in a sharp corner, the gasket sharp corner being of complementary configuration and sealing within and stopping against the integral, circular, angular corner of the internal groove.

6. The pipe bell of claim 5 wherein the sealing lip is triangular in cross sectional configuration and wherein the leading lip is triangular in cross sectional configuration.

7. The pipe bell of claim 5 wherein a radially open, circular groove is formed in the gasket body intermediate the leading lip and the sealing lip.

8. The pipe bell of claim 7 and an annular ring removably insertable into the gasket circular groove, the annular ring being fabricated of a material that is harder than the resilient gasket material.

9. The pipe bell of claim 8 wherein the annular ring is fabricated of polypropylene plastic.

10. The pipe bell of claim 7 and means to retain the gasket within the groove, the means to retain comprising the seat formed between the angular corner of the groove, and wherein the means to retain comprises a contact between the bent retainer and a forward portion of the gasket, the bent retainer urging the contacted portion of the gasket radially inwardly.

11. The pipe bell of claim 10 wherein the gasket body terminates radially outwardly in a circular, arched back, the back being forwardly defined by a corner and rearwardly defined by the said angular corner, the arch extending from the front corner to the rear angular corner.

12. The pipe bell of claim 1 wherein the groove is defined radially outwardly by a cylindrical base and wherein the arched back of the gasket body is positioned circularly adjacent to the groove cylindrical base whereby additional sealing forces can be applied at the sealing lip.

13. In a gasket suitable for insertion into a circular groove formed in the bell of a plastic pipe, the combination of an annular body fabricated of resilient material,
the body terminating radially inwardly in a leading lip and a rearwardly spaced sealing lip,
the body terminating radially outwardly in generally circular back,
the back being forwardly defined by a forward corner and being rearwardly defined by a sharp, angular corner, the sharp corner being configured to a sharp angle that is less than ninety-one degrees, and the back being arched in cross section, the back arch extending from the forward corner to the rearward, sharp corner.

14. The gasket of claim 13 wherein the sealing lip and the leading lip are triangular in cross sectional configuration.

15. The gasket of claim 14 wherein the sealing lip extends further radially inwardly than the leading lip.

16. The gasket of claim 14 wherein a radially open, circular groove is formed in the gasket body intermediate the leading lip and the sealing lip.

17. The gasket of claim 16 and an annular ring removably insertable into the gasket circular groove, the annular ring being fabricated of a material that is harder than the resilient gasket material.

* * * * *

UNITED STATES PATENT AND TRADEMARK OFFICE
CERTIFICATE OF CORRECTION

PATENT NO. : B1 4,343,480
DATED : June 6, 1989
INVENTOR(S) : Efrain D. Vassallo

It is certified that error appears in the above-identified patent and that said Letters Patent is hereby corrected as shown below:

On the title page,

"Assignee: Industrias Vassallo, Inc.,"

Should read,

-- Assignee: Vassallo Research & Development Corporation, --

Signed and Sealed this

Sixteenth Day of October, 1990

*Attest:*

HARRY F. MANBECK, JR.

*Attesting Officer*  *Commissioner of Patents and Trademarks*

REEXAMINATION CERTIFICATE (1077th)

United States Patent [19]

Vassallo

[11] B1 4,343,480

[45] Certificate Issued Jun. 6, 1989

[54] PIPE BELL AND GASKET

[75] Inventor: Efrain D. Vassallo, Ponce, P.R.

[73] Assignee: Industrias Vassallo, Inc., Ponce, P.R.

Reexamination Request:
No. 90/001,264, Jun. 18, 1987

Reexamination Certificate for:
| | |
|---|---|
| Patent No.: | 4,343,480 |
| Issued: | Aug. 10, 1982 |
| Appl. No.: | 162,377 |
| Filed: | Jun. 23, 1980 |

[51] Int. Cl.$^4$ .............................................. F16J 15/32
[52] U.S. Cl. .............................. 277/207 A; 277/208;
285/110; 285/231; 285/345; 285/379
[58] Field of Search ............ 277/207 R, 207 A, 207 B,
277/208, DIG. 2; 285/110, 230, 231, 232, 345,
379

[56] References Cited

U.S. PATENT DOCUMENTS

| | | |
|---|---|---|
| Re. 27,736 | 8/1973 | Muhlner et al. . |
| 2,146,641 | 2/1939 | McWane . |
| 2,272,811 | 2/1942 | Nathan . |
| 2,529,098 | 11/1950 | Noll . |
| 3,363,912 | 1/1968 | Holloway . |
| 4,331,625 | 5/1982 | van de Zee et al. . |

FOREIGN PATENT DOCUMENTS

| | | | |
|---|---|---|---|
| 36372 | 8/1981 | Austria . | |
| 2299586 | 8/1976 | France . | |
| 7803870 | 10/1979 | Sweden | .......... 277/DIG. 2 |
| 1547082 | 6/1979 | United Kingdom . | |

OTHER PUBLICATIONS

Multi Fittings brochure entitled "PVC Gasketed Sewer Main Fittings", published prior to 1977.
Multi Fittings brochure entitled "Gasketed Fittings", published prior to 1977.

*Primary Examiner*—Robert S. Ward, Jr.

[57] ABSTRACT

A pipe bell including a radially extending groove which is defined rearwardly by an acute angle of design to firmly seat a gasket therein. The groove is forwardly defined by an inwardly curved mouth or inward bend of suitable size to receive the spigot end of the next adjacent pipe length therein. A gasket which includes a forward, circular lip and an integral, rearward, larger lip is positioned within the groove to seal against the spigot end of the next adjacent pipe length. The gasket includes an angular rear shoulder of suitable configuration to lock within the pipe groove between the rearward acute angle and the forward bent end and may be peripherally outwardly arcuately shaped for better sealing. If desired, the gasket may be provided with an inwardly open groove to receive therein a plastic retaining and locking ring to aid in preventing seal movement.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 21–44:
Referring now to FIGS. 1 and 2, it will be noted that the internal groove 16 is formed of sufficient depth to receive therein the annular gasket 26. The groove is rearwardly defined by a sharp corner or angle 22. The corner 22 is formed at an angle of [more] *less* than ninety-one degrees from a line parallel to the axis of the pipe 10 and preferably is an acute angle. The corner 22 is open in the direction of spigot end insertion to thereby resist the forces tending to unseat the gasket 26. The groove 16 is forwardly or endwardly defined by a bent end or retainer 18 which may be conveniently formed by radially inwardly bending the end of the hub as illustrated. The gasket retainer 18 terminates in an annular angular edge 20, which angle projects at approximately forty-five degrees from the surface of the spigot end 24 to provide a peripheral, inclined, entrance channel to facilitate guiding the spigot end 24 into the hub 12 when making the joint. As best seen in FIG. 2, the retainer 18 terminates in circular, spaced relationship radially outwardly from the pipe spigot end 24 to define an annular clearance space 36 between the bell or hub 12 of the fitting 10 and the spigot end 24 of the next adjacent length of pipe when the junction between the two plastic parts is formed.

AS A RESULT OF REEXAMINATION, IT HAS BEEN DETERMINED THAT:

The patentability of claims 13–17 is confirmed.

Claims 1 and 12 are determined to be patentable as amended.

Claims 2–11, dependent on an amended claim, are determined to be patentable.

New claims 18–48 are added and determined to be patentable.

1. A pipe bell in the cylindrical body of a pipe or fitting, the pipe or fitting having a longitudinal axis comprising
an enlarged, generally cylindrical, one piece hub formed in the forward end of the said body, the hub having a cylindrical *non-gasketed* section of a first diameter suitable to overfit an end of an adjacent length of pipe, the hub including an integral, radially inward open, internal *gasket-receiving* groove of a second diameter, the second diameter being greater than the first diameter,
the internal groove being defined forwardly by an integral, radially inward bent retainer,
the internal groove being defined rearwardly by an integral, circular, angular corner,
the bent retainer and the hub being of unitary construction.

12. The pipe bell of claim [1] *11* wherein the groove is defined radially outwardly by a cylindrical base and wherein the arched back of the gasket body is positioned circularly adjacent to the groove cylindrical base whereby additional sealing forces can be applied at the sealing lip.

*18. The pipe bell of claim 2 wherein the angle defined by the corner is less than 90°.*

*19. The pipe bell of claim 18 wherein the angle defined by the corner is substantially less than 90°.*

*20. The pipe bell of claim 1 wherein said angular corner is defined by the junction of a cylindrical surface and a frustoconical surface.*

*21. The pipe bell of claim 1 wherein said hub has a uniform thickness through said cylindrical section, said groove and said retainer.*

*22. The pipe bell of claim 1 wherein said hub has a cylindrical part having an internal diameter equal to said second diameter between said angular corner and said retainer.*

*23. The pipe bell of claim 22 wherein said retainer and said cylindrical part define an obtuse angle therebetween.*

*24. The pipe bell of claim 22 wherein a rounded forward corner of said groove joins said retainer and said cylindrical part.*

*25. The pipe bell of claim 1 wherein said angular corner is a sharp angle.*

*26. The pipe bell of claim 1 wherein said retainer extends non-perpendicularly relative to said longitudinal axis.*

*27. The pipe bell of claim 4 wherein said circular edge lies between said first and second diameters.*

*28. The pipe bell of claim 1 wherein said retainer comprises a circular inner edge having a diameter greater than said first diameter.*

*29. The pipe bell of claim 1 wherein a portion of said hub extends axially forwardly at a point radially inwardly of said angular corner defining a shoulder for retaining a gasket in said groove.*

*30. The pipe bell of claim 1 wherein said cylindrical section of said hub has a uniform inner diameter defining an axially extending uniform clearance between the cylindrical section and a spigot rearwardly of said groove.*

*31. The pipe bell of claim 1 wherein said retainer is joined to said hub by a smoothly curved portion thereof.*

*32. The pipe bell of claim 1 and a gasket removably insertable into the groove, the gasket terminating rearwardly in a sharp corner, the gasket sharp corner being of complementary configuration and sealing within and stopping against the integral, circular, angular corner of the internal groove.*

*33. The pipe bell of claim 32 wherein the gasket terminates radially outwardly in a circular, arched back, the back being forwardly defined by a corner and rearwardly defined by the said angular corner, the arch extending from the front corner to the rear angular corner.*

*34. A pipe bell in the cylindrical body of a pipe or fitting, the pipe or fitting having a longitudinal axis comprising
an enlarged, generally cylindrical, one piece hub formed in the forward end of the said body, the hub having a cylindrical section of a first diameter suitable to overfit an end of an adjacent length of pipe, the hub in-* cluding an integral, radially inward open, internal groove of a second diameter, the second diameter being greater than the first diameter, the internal groove being defined forwardly by an integral, radially inward bent retainer, the internal groove being defined rearwardly by an integral, circular, angular corner, the bent retainer and the hub being of unitary construction, the cylindrical section of the hub having a uniform inner diameter defining an axially extending uniform clearance between the cylindrical section and a spigot rearwardly of the groove.

35. A pipe bell in the cylindrical body of a pipe or fitting, the pipe or fitting having a longitudinal axis comprising an enlarged, generally cylindrical, one piece hub formed in the forward end of the said body, the hub having a cylindrical section of a first diameter suitable to overfit an end of an adjacent length of pipe, the hub including an integral, radially inward open, internal groove of a second diameter, the second diameter being greater than the first diameter, the internal groove being defined forwardly by an integral, radially inward bent retainer, the internal groove being defined rearwardly by an integral, circular, angular corner, the bent retainer and the hub being of unitary construction, the retainer being joined to the hub by a smoothly curved portion thereof.

36. A pipe bell in the cylindrical body of a pipe or fitting, the pipe or fitting having a longitudinal axis comprising an enlarged, generally cylindrical, one piece hub formed in the forward end of the said body, the hub having a cylindrical section of a first diameter suitable to overfit an end of an adjacent length of pipe, the hub including an integral, radially inward open, internal groove of a second diameter, the second diameter being greater than the first diameter, the internal groove being defined forwardly by an integral, radially inward bent retainer, the internal groove being defined rearwardly by an integral, circular, angular corner and axially extending shoulder for retaining a gasket, the bent retainer and the hub being of unitary construction.

37. The pipe bell of claim 36 wherein the angle defined by the corner is less than 90°.

38. The pipe bell of claim 37 wherein the angle defined by the corner is substantially less than 90°.

39. The pipe bell of claim 36 wherein said angular corner is defined by the junction of a cylindrical surface and a frustoconical surface.

40. The pipe bell of claim 36 wherein said hub has a uniform thickness through said cylindrical section, said groove and said retainer.

41. The pipe bell of claim 36 wherein said hub has a cylindrical part having an internal diameter equal to said second diameter between said angular corner and said retainer.

42. The pipe bell of claim 41 wherein said retainer and said cylindrical part define an obtuse angle therebetween.

43. The pipe bell of claim 41 wherein a rounded forward corner of said groove joins said retainer and said cylindrical part.

44. The pipe bell of claim 36 wherein said angular corner is a sharp angle.

45. The pipe bell of claim 36 wherein said retainer extends non-perpendicularly relative to said longitudinal axis.

46. The pipe bell of claim 36 wherein the bent retainer terminates forwardly in an angular, circular edge, the circular edge forming an angle of approximately forty-five degrees with a line drawn parallel to the said longitudinal axis, the bent retainer defining an annular clearance space between the bent retainer and the said end of an adjacent length of pipe.

47. The pipe bell of claim 46 wherein said circular edge lies between said first and second diameters.

48. The pipe bell of claim 36 wherein said retainer comprises a circular inner edge having a diameter greater than said first diameter.

* * * * *